United States Patent [19]
Tamburrino et al.

[11] Patent Number: 6,090,857
[45] Date of Patent: Jul. 18, 2000

[54] FOAM CONTROL AGENT FOR PAINTS AND COATINGS

[75] Inventors: Jeffrey Todd Tamburrino, Boonton; Andrew Anthony Romano, Sparta, both of N.J.

[73] Assignee: Ashland Inc., Dublin, Ohio

[21] Appl. No.: 09/162,683

[22] Filed: Sep. 29, 1998

[51] Int. Cl.[7] ........................................................ B01F 3/08
[52] U.S. Cl. ................................ 516/20; 516/23; 516/34; 516/110; 516/112
[58] Field of Search ................................... 516/20, 23, 34, 516/110, 112

[56] References Cited

PUBLICATIONS

Kirk–Othmer: Encyclopedia of Chemical Technology, vol. 7, Third Edition, pp. 430–447, 1993.

*Primary Examiner*—John M. Cooney, Jr.
*Attorney, Agent, or Firm*—David L. Hedden

[57] ABSTRACT

This invention relates to a foam control agent which comprises the reaction product prepared by reacting: (a) a hydrocarbon carrier; (b) a precipitated amorphous silicate; (c) a refractory clay; and (d) a reactive silicone in the presence of a catalytically effective amount of a basic catalyst at elevated temperatures.

8 Claims, No Drawings

FOAM CONTROL AGENT FOR PAINTS AND COATINGS

FIELD OF THE INVENTION

This invention relates to a foam control agent which comprises the reaction product prepared by reacting: (a) a hydrocarbon carrier; (b) a precipitated amorphous silicate; (c) a refractory clay; and (d) a reactive silicone, in the presence of a catalytically effective amount of a basic catalyst at elevated temperatures.

BACKGROUND OF THE INVENTION

A foam control agent is often essential to a paint, particularly latex emulsions, and coatings. Without the foam control agent, bubbles will form in the paint or coating. When the paint or coating is applied to the substrate, the bubbles will dry on the substrate. These dried bubbles are not aesthetically pleasing. Furthermore, a substrate with dried bubbles is not effectively covered and protected from the environment.

Many foam control agents for paints and coatings are currently available. Foam control agents typically consist of hydrophobic materials dispersed in carrier oils alcohols, water or other liquids. Hydrophobic materials are waxes or silicon dioxide. Typically, foam control agents for latex emulsions consist of a carrier (i.e. a mineral oil), and a hydrophobic material and/or a silicone.

U.S. Pat. No. 5,575,950, which is hereby incorporated by reference into this specification, discloses defoaming compositions comprising, as a mixture, a hydrophobized aluminum treated silicate, and a defoaming carrier. Although it is claimed that the defoamers have improved properties, experience has shown that the defoamers do not maintain their homogeneous state because the components of the defoamer settle over time. This creates defects when the paints and coatings containing the defoamers are applied to the substrate and dried.

SUMMARY OF THE INVENTION

This invention relates to a foam control agent which comprises the reaction product prepared by reacting:

(a) a hydrocarbon carrier;

(b) a precipitated amorphous silicate;

(c) a refractory clay; and (d) a reactive silicone, in the presence of a catalytically effective amount of a basic catalyst at an elevated temperature.

By reacting a precipitated amorphous silicate and a refractory clay in the presence of heat and a basic catalyst, a separation-stable foam control agent with improved shelf-life is obtained.

The invention also relates to formulated paints and coatings, particularly latex emulsion paints, which contain the foam control agents. Paints and coatings containing the foam control agent are not likely to form solids which settle during storage. As a result, the foam control agents can be used in thin film applications where particles will interfere in film formation. Paints and coatings containing the foam control agents will also form less grit during processing.

ENABLING DISCLOSURE AND BEST MODE

This invention relates to a foam control agent which comprises the reaction product prepared by reacting: prepared by reacting: (a) a hydrocarbon carrier; (b) precipitated amorphous silicate; (c) a refractory clay; and (d) a reactive silicone in the presence of a catalytically effective amount of a basic catalyst at elevated temperatures.

A broad range of water immiscible fluids can be used as the carrier. These include normally liquid hydrocarbons and vegetable oils. Preferably used are normally liquid hydrocarbons such as tetradecane, isooctane, hexadecane mineral oil, and kerosene. The hydrocarbon carrier generally has a pour point in the range of about −40° C. to −10° C.

In general, any precipitated amorphous silicate can be used to prepare the foam control agents. Particularly useful are alkali aluminosilicates containing an alkaline earth metal, and precipitated silicone dioxides. These compositions are well know in the art, and are described in U.S. Pat. Nos. 3,798,046, 3,909,286, and 3,915,734, all of which are incorporated by reference into this disclosure. Preferably used as the precipitated amorphous aluminosilicate is sodium magnesium aluminosilicate, sold under the tradename "HYDREX" by J. M. Huber Corporation.

The alkali aluminosilicates typically contain a chemically bound alkaline earth metal. The alkaline earth metal is preferably calcium, magnesium or barium while the alkali metal preferably sodium. The aluminosilicate particles are precipitated amorphous materials composed of particles having ultimate sizes of only a few hundredths of a micron in diameter which tend to cling together in clusters of up to about 1 micron in diameter. In chemical composition, they typically contain $Na_2O$ and $Al_2O_3$ in a molar ratio of about 1, typically in the range of about 0.8 to 1.2 moles of $Na_2O$ per mole of $Al_2O_3$. The amount of silica present in any of various selected concentrations ranges from as little as about 2.5 mole to as much as about 16 moles of $SiO_2$ per mole of $Al_2O_3$.

Refractory clays used in the foam control agents are also well known. Particularly useful are aluminosilicate refractories, preferably kaolin (also known as china clay), clay, and kaolinite, most preferably kaolin.

Silicone compounds which are typically used to prepare the foam control agent are polydimethyl siloxanes, often trimethyl silyl terminated, preferably a silanol terminated polydimethyl siloxane. Generally, they are sold commercially as fluids or emulsions (which contain water and a surfactant as well the silicone compound). Examples of commercially available products which contain silicone compounds and are effective include DC 200 sold by Dow Coring Corporation and L-45-350 sold by Union Carbide.

The basic catalyst can be any basic compound which will raise the pH of the reactants to at least 7.0, preferably 7.5 to 9.0. Examples of bases which can be used in the subject invention include ammonia, ammonium hydroxide, alkali and alkaline earth metal hydroxides, and organic amines such as amino methyl propane triethanol amine.

The amounts of the components used to make the foam control agent are as follows, where said weight percents are based upon the total weight of foam control agent:

(a) from 25 to 95 weight percent of hydrocarbon carrier, preferably 50 to 80 weight percent;

(b) from 5 to 50 weight percent of precipitated amorphous silicate, preferably 10 to 30 weight percent;

(c) from 1 to 50 weight percent of a refractory clay, preferably 5 to 25, more preferably 7 to 15 weight percent; and (d) from 0.5 to 10 weight percent of a reactive silicone, preferably from 1 to 5 weight percent.

The foam control agent is preferably prepared by adding the carrier to a reaction vessel and heating to about 65° C.

to 85° C. preferably about 77° C. Then the reactive silicone oil is added followed by the slow addition of precipitated amorphous silicate with thorough mixing while maintaining the elevated temperature. Additional carrier is then added followed by the addition of the refractory clay. Finally, the basic catalyst is added and mixed at elevated temperatures preferably 110° C.

The resulting foam control agent is then preferably reduced to a maximum particle size of less than 60 microns, most preferably from 30 to 50 microns. Particle size reduction is typically accomplished by milling, preferably in a media mill containing zirconium ceramic beads, according to well known methods.

The foam control agents can be stored at temperatures of 0° C. to 40° C. for several months (typically up to six or even twelve months) before using them without a phase separation. They are typically mixed in paints or coatings, preferably latex emulsions, in amounts of 0.01 to 2.0 part by weight based upon the weight of the latex emulsion, preferably from 0.2 to 0.8 part by weight.

Such formulated paints and coatings may include one or more of the following components in a addition to a foam control agent: (1) 5.0 to 25.0 parts by weight of a latex emulsion (2) 20.0 to 60.0 parts by weight of water; (3) 1.0 to 40 parts by weight of a pigment; (4) 1.0 to 10.0 parts by weight of a polymeric binder; (5) 1.0 to 10 parts by weight of a coalescing aid; (6) 1.0 to 10.0 parts by weight of a thickener; (7) 0.1 to 2.0 parts by weight of a dispersant; (8) 0.01 to 1.0 part by weight of a biocide; (9) 5.0 to 40.0 parts by weight of an extender pigment; (10) 1.0 to 5.0 parts by weight of a rheology modifier; (11) 1.0 to 5.0 parts by weight of a glycol, e.g. propylene glycol; (12) 0.1 to 2.0 parts by weight of a surfactant; and (13) 0.01 t2.0 parts by weight of a base, e.g. ammonium hydroxide.

Optional components of the foam control agent include sorbitan tristearate, waxes, surfactants, fatty acid esters, and end capped propylene oxide and/or butylene oxide polymers.

EXAMPLE 1

A foam control agent (FCA) was prepared with the components set forth in Table I.

TABLE I

COMPOSITION OF FOAM CONTROL AGENT (FCA)

| COMPONENT | AMOUNT (pbw) |
|---|---|
| Paraffinic oil 100 second visc | 75.7 |
| HYDREX[1] (sodium magnesium aluminosilicate) | 14.0 |
| ASP 200 (kaolin) | See Table 11 |
| Reactive silicone[2] | 1.0 |
| Aqua ammonia catalyst (AAC) [28% in water] | 0.3 |

[1]HYDREX is a sodium magnesium aluminosilicate sold by J M Huber, ASP 200 is a product of Englehard.
[2]The reactive silicones used were either Dow Corning Q1 3563 or Wacker F1006.

The foam control agent is prepared by adding about 75 weight percent of the parraffin oil to a reaction vessel where it is heated to about 77° C. Then the reactive silicone oil is added followed by slow addition of the HYDREX and mixing about 10 minutes while maintaining the temperature. The mixture is heated to 110° C., and the remaining paraffinic oil is added while maintaining the temperature. The ASP 200 is then added while maintaining the temperature. Thereafter, the AAC is added and mixed for about for 30 to 45 minutes at 110° C.

The product is milled in a media mill with zirconium beads until it reached an maximum particle size of less than about 60 microns, preferably about 30 to 50 microns.

EXAMPLE 2

Foam control agents containing zero refractory clay (Control) and various amounts of the refractory clay of Example 1 were placed in a test tube. The samples were stored at room temperature and at 50° C. Stability (as evidenced by the absence of separation) of the Control and the samples containing the refractory clay was measured after seven days and after thirty days by determining the amount (in centimeters) of process oil which accumulated on the top of the sample. The results are summarized in Table II which follows.

TABLE II

STABILITY TEST RESULTS FOR FOAM CONTROL AGENTS

| EXAM- | | ROOM TEMPERATURE | | 50° C. | |
|---|---|---|---|---|---|
| PLE | Clay | 7 DAYS | 30 DAYS | 7 DAYS | 30 DAYS |
| CONTROL | 0 | Completely separated. | See prior column. | Completely separated. | See prior column. |
| 1 | 1.0 | 13 cm | 20 cm | NT[3] | NT |
| 2 | 5.0 | 6 cm | 16 cm | NT | NT |
| 3 | 9.0 | 2 cm | 2 cm | 2 cm | 4 cm |

[3]NT = not tested

The data in Table II indicate that the Control was unstable after 7 days and after 30 days. Examples 1, 2, and 3 indicate that the addition of the refractory clay agent improved stability of the sample containing the refractory clay. The improvement in stability is a function of the amount of the refractory clay used. Example 3, which showed the most improvement, contains 9.0 parts of refractory.

EXAMPLE 3

In order to test the effectiveness of the foam control agents, 0.2 part of the foam control agent of Example 3 was added to an interior paint formulation which did not contain a foam control agent (Control). The composition of the interior paint was:

| Component | Weight % |
|---|---|
| Water | 33.3 |
| Extender pigment | 28.6 |
| Titanium dioxide | 16.4 |
| Latex emulsion | 16.4 |
| Rheology modifier | 2.6 |
| Propylene glycol | 0.8 |
| Foam control agent | see Table III |
| Dispersant | 0.50 |
| Surfactant | 0.20 |
| 28% Ammonium hydroxide | 0.20 |
| Coalescent | 0.30 |
| Microbiocide | 0.05 |
| | 100.0 |

The Control and a formulation with 0.2 part of the foam control agent (Example 4) are tested for foaming. Each of the formulations tested is placed in a paint shaker and agitated for 5 minutes in order to generate foam. At the end of the 5 minutes, the density of 100 cc of the paint was determined. The density is the weight of the paint divided by the volume. A lower density for an equal volume of liquid indicates that the liquid contains more entrapped air which is a reflection of increased foaming.

The "bubble break" time of the paint is also measured. The bubble break time is the time it takes for a bubble to break after paint application by roller. After a bubble appears, the amount of time for it to break is measured. If the time is less, this indicates that the foam control agent works more effectively.

The results of the density tests and bubble break tests for the Control (without a foam control agent) and the interior paint containing the foam control agent are shown in Table III.

TABLE III

EFFECTIVENESS OF FOAM CONTROL AGENT IN INTERIOR PAINT

| EXAMPLE | DOSAGE | SHAKE DENSITY (g/L) | BUBBLE BREAK TIME (Seconds) |
|---|---|---|---|
| Control | 0 | 0.84 g/L | >300 |
| 4 | 0.2 | 1.24 g/L | 35 |

The data indicate that the addition of the foam control agent significantly reduced the foam properties of the interior paint tested.

We claim:

1. A foam control agent which comprises a reaction product prepared by reacting:
   (a) a hydrocarbon carrier;
   (b) a precipitated amorphous silicate;
   (c) an effective stabilizing amount of a refractory clay; and
   (d) a reactive silicone,
   in the presence of a catalytically effective amount of a basic catalyst.

2. The foam control agent of claim 1 wherein the refractory clay is hydrated kaolin such that the amount of hydrated koalin is at least 5.0 parts by weight based upon the weight of components (a), (b), (c), and (d).

3. The foam control agent of claim 2 where the precipitated amorphous silicate is sodium magnesium alumino silicate.

4. The foam control agent of claim 3 wherein the weight of the components of said foam control agent is:
   (a) from 60 to 80 weight percent of a hydrocarbon carrier;
   (b) from 10 to 20 weight percent of precipitated amorphous silicate; and
   (c) from 5 to 15 weight percent of a reactive silicone.

5. The foam control agent of claim 4 where the reactive silicone is a silanol terminated polydimethyl siloxane.

6. The foam control agent of claim 5 where the catalyst is diluted ammonium.

7. The foam control agent of claim 6 where the particle size of the foam control agent is from 40 to 60 microns.

8. The foam control agent of claim 7 wherein the hydrated kaolin is used an amounts from 7.0 parts by weight to 12.0 parts by weight based upon the weight of components (a), (b), (c), and (d).

* * * * *